US008364583B1

(12) United States Patent
Mussman et al.

(10) Patent No.: US 8,364,583 B1
(45) Date of Patent: Jan. 29, 2013

(54) METHOD AND APPARATUS FOR PROCESSING A CARDHOLDER'S INQUIRY OR DISPUTE ABOUT A CREDIT/CHARGE CARD

(75) Inventors: David C. Mussman, Lincoln, NE (US); Rodney J. Kempkes, Omaha, NE (US); Mark J. Pettay, Omaha, NE (US)

(73) Assignee: West Corporation, Omaha, NE (US)

( * ) Notice: Subject to any disclaimer, the term of this patent is extended or adjusted under 35 U.S.C. 154(b) by 1201 days.

(21) Appl. No.: 09/638,728

(22) Filed: Aug. 14, 2000

(51) Int. Cl.
*G06Q 40/00* (2006.01)
(52) U.S. Cl. ........................................... 705/39; 705/40
(58) Field of Classification Search .................... 705/34, 705/38, 35, 39–42, 36, 37, 43, 44
See application file for complete search history.

(56) References Cited

U.S. PATENT DOCUMENTS

| | | | | |
|---|---|---|---|---|
| 5,432,326 A | * | 7/1995 | Noblett et al. | 235/380 |
| 5,557,515 A | | 9/1996 | Abbruzzese et al. | |
| 5,729,693 A | | 3/1998 | Holda-Fleck | |
| 5,995,948 A | * | 11/1999 | Whitford et al. | 705/41 |
| 6,098,053 A | | 8/2000 | Slater | |
| 6,141,651 A | | 10/2000 | Riley et al. | |
| 6,343,279 B1 | * | 1/2002 | Bissonette et al. | 705/41 |
| 6,553,108 B1 | * | 4/2003 | Felger | 379/144.01 |
| 6,601,761 B1 | | 8/2003 | Katis | |
| 6,694,300 B1 | | 2/2004 | Walker et al. | |
| 6,941,286 B1 | * | 9/2005 | Foth | 705/403 |
| 7,016,864 B1 | | 3/2006 | Notz et al. | |
| 7,249,113 B1 | * | 7/2007 | Continelli et al. | 705/80 |
| 2001/0034720 A1 | * | 10/2001 | Armes | 705/65 |
| 2001/0044729 A1 | * | 11/2001 | Pomerance | 705/1 |
| 2002/0010591 A1 | * | 1/2002 | Pomerance | 705/1 |
| 2002/0035541 A1 | | 3/2002 | Makino et al. | |
| 2002/0062254 A1 | | 5/2002 | Matsko | |
| 2002/0099649 A1 | * | 7/2002 | Lee et al. | 705/38 |
| 2003/0004798 A1 | | 1/2003 | McAuliffe et al. | |
| 2004/0122736 A1 | | 6/2004 | Strock et al. | |

OTHER PUBLICATIONS

Pomerance, B., Provisional U.S. Appl. No. 60/216,222, "Automated Dispute Resolution System", Jul. 5, 2000.*
Pomerance, B., Provisional U.S. Appl. No. 60/216,222, "Automated Dispute Resolution Website", May 11, 2000.*
Kim Craig, West Teleservices & First of Omaha, Presentation, May 18, 2000.
Ipayment, Inc., Merchant Services Electronic Commerce Risk Management Guidelines, Guide, Oct. 2000.

(Continued)

*Primary Examiner* — Hani M Kazimi

(57) ABSTRACT

A method and system for processing a credit request from a credit/charge cardholder which automatically applies a rules-based decision process to determine whether to credit the cardholder's account, the amount of the credit, whether to do a chargeback to the merchant, and the amount of the chargeback. Individual issuing banks who issue credit/charge cards and individual merchants may specify custom rules which must be considered before a credit is issued and/or before a chargeback to the merchant is performed. The rules set forth the conditions under which the merchant will waive its right to prove the disputed transaction such that a chargeback is automatically issued to the merchant. For example, a merchant may specify that if the transaction is $20 or less, it will accept an automatic chargeback without the merchant's involvement and if the transaction is greater than $20, the merchant wants to receive notice of the dispute and the opportunity to prove or verify the authenticity of the transaction. In one aspect, the system may optionally include the blocking of calls based upon a list of potential callers from whom further transactions or requests for chargeback will be declined. The callers ANI or calling number identification is compared against the list, and the calls are not answered by the system.

53 Claims, 5 Drawing Sheets

OTHER PUBLICATIONS

Visa, Visa E-Commerce Merchants' Guide to Risk Management, Guide, 2002.
Visa, Electronic Commerce Risk Management Merchant Best Practices, Guide, Dec. 1999.
Visa, Chargeback Management Guide for Visa Merchants, Guide, Jun. 1999.
First of Omaha, First Focus 2000, Seminar, 2000.

* cited by examiner

METHOD AND APPARATUS FOR PROCESSING A CARDHOLDER'S INQUIRY OR DISPUTE ABOUT A CREDIT/CHARGE CARD

FIELD OF THE INVENTION

These inventions relate to methods, software and apparatus for processing a credit/charge cardholder's inquiry or dispute about a credit/charge transaction which processes credit and chargeback requests at a significantly lower cost and in a significantly reduced time.

BACKGROUND OF THE INVENTION

Consumers and merchants are familiar with credit cards and charge cards such as Visa, Mastercard, American Express, Discover, Diners/Carte Blanche and JCB (Japanese Credit Bureau). Each of these credit/charge cards hereinafter referred to collectively as "credit cards" for convenience) companies may have their own operating rules and regulations by which consumers and merchants must abide. As shown in FIG. 1, a typical transaction involves a cardholder 1 who is the consumer purchasing a good or service, a merchant 5 who is the transaction originator of the good or service purchased by the cardholder 1, an issuing bank 2 which is the financial institution that issued the credit card to the cardholder, and an acquiring bank 4 which is the financial institution that represents merchants in accepting credit card transactions. The term 'bank' is used herein in a broad, inclusive sense to mean any entity or person with who or through whom a financial transaction passes.

The acquiring bank 4 is also referred to as a merchant processor. A typical transaction cycle commencing with a purchase of a good or service by a cardholder 1 from a merchant 5 is also called a "first presentment" transaction. In the first presentment transaction cycle, the cardholder 1 purchases a product or service from a merchant 5. The merchant 5 presents the transaction data such as the charge for the good or service to the acquiring bank 4 for processing. The merchant 5 may present this charge to the acquiring bank 4 directly, or through an intermediary institution, a third party processor, such as First Data Corporation. The acquiring bank 4 then submits the charge transaction to a Visa Interchange Center (VIC) 3. The VIC 3 performs authorization and settlement functions and then submits the transaction to the issuing bank 2 and the issuing bank 2 charges the cardholder 1. If the merchant 5 presented the charge transaction directly to the intermediary institution, the intermediary institution submits the transaction through an acquiring bank which functions as a Visa Access Point ("VAP"), which then forwards the transaction to the VIC 3 and the VIC 3 submits the transaction to the issuing bank 2 for charge to the cardholder 1.

After a cardholder 1 receives his monthly billing statement from the issuing bank 2, the cardholder 1 may dispute a transaction or wish to inquire for further information about a transaction appearing on the monthly statement. This starts the retrieval cycle, as shown in FIG. 2. In roughly 80% of the cases, the cardholder 1 contacts the issuing bank 2 rather than the merchant 5. This step is shown as "initial contact" in FIG. 2. In fact, issuing banks usually invite their cardholders to bring any inquiries or disputes about transactions directly to the issuing bank and provide a telephone number, often a toll free telephone number or via a website.

The following is a description of a typical chargeback procedure. Assuming that the disputed transaction occurred on a Visa or MasterCard credit card, the issuing bank 2 requests validation and chargeback information from the VIC 3, as shown in step 2 of FIG. 2. The VIC 3 contacts the acquiring bank 4 and asks for validating documentation such as a signed credit card slip, as shown in step 3. The acquiring bank 4 contacts the merchant 5 and asks the merchant 5 to submit proof of the transaction, as shown in step 4. Each party is allowed a presentment period to submit the requested documentation. Since the presentment period may be significant, e.g., 45 days for each step in the chain of the transaction, the total time may be a matter of 6 months or more. Validating documentation proving the transaction, if any, is sent by the merchant 5 to the acquiring bank 4 through the Visa network 3 to the issuing bank 2, as shown in steps 5, 6 and 7. This entire process may be repeated depending upon circumstances and rules regarding the chargeback process. Rules regarding the chargeback process for non-written transactions shifts the risk of chargeback verification to the merchant and the transaction is presumed fraudulent without a written transaction slip. There are additional rules that apply and such rules vary between issuing and acquiring banks. With the advent of internet and mail order merchants, the number of non-face-to-face transactions has increased. This has therefore increased the number of non-written transactions. The interchange rules have not always kept pace with this change in consumer purchasing behavior. Because a consumer's purchase of a good or service over the telephone or internet does not result in a signed transaction, such transactions are presumed to be "fraud related" by the VIC 3. The VIC 3 initiates a certain protocol and investigation for fraud-related transactions. The acquiring bank 4 checks for credits and any preauthorizations and sends documentation received from the merchant 5 to the issuing bank 2. The disputed transaction is evaluated and a rules-based decision is made.

If the transaction is to be credited to the cardholder 1, the issuing bank 2 makes a chargeback against the merchant 5 through VIC 3 and the acquiring bank 4, as shown in steps 8, 10 and 11. VIC 3 maintains a history of chargebacks for each merchant 5. In step 10, VIC may impose additional fees and penalties on the chargeback. If a given merchant has a history of excessive chargebacks, such as more than 1% of sales, the merchant can be fined or terminated from servicing Visa cardholders. The merchant 5 eventually pays the funds to the acquiring bank 4 which forwards them to VIC 3, the issuing bank 2 and the consumer 1.

Thus, it is apparent that many hands touch a single transaction. Because many hands at numerous institutions are required to process a dispute over a single transaction, each institution incurs a cost to process a single disputed transaction. When this cost is multiplied across numerous transactions, the costs are quite high. Consequently, the inquiry process and chargeback process imposes significant costs on the merchant, the issuing bank, the acquiring bank and the credit/charge card network and delays valid credits or resolution to the consumer. Each entity must expend resources to track, record, investigate, and follow up on disputed transactions.

Therefore, there is a need for a process and apparatus which resolves disputed transactions and chargebacks in a manner which reduces the tremendous cost to the various parties and speeds up the valid credits or resolution to the consumer.

SUMMARY OF THE INVENTION

The present inventions include methods for processing a cardholder's inquiry or dispute about a credit/charge transaction which reduces the cost of issuing a credit to the cardholder and a chargeback to the merchant, and of the hardware systems and software for performing the inventive methods.

A first, separate aspect of the present invention is a method of processing a cardholder's credit inquiry which includes the steps of obtaining information about the disputed transaction from the cardholder, applying a rules-based decision process to determine whether a credit should issue automatically to the cardholder, and if so, automatically issuing a credit to the cardholder.

A second, separate aspect of the present invention is a method of processing a cardholder's credit inquiry which includes the steps of obtaining information about the disputed transaction, applying a rules-based decision process to determine whether a credit should issue automatically to the cardholder, automatically issuing a credit to the cardholder when certain conditions are satisfied and investigating the disputed transaction further when certain conditions are not satisfied.

A third, separate aspect of the present invention is a method of processing a cardholder's credit inquiry which includes the steps of obtaining rules for a rules-based decision process from a merchant or issuing bank, obtaining information about the disputed transaction, applying the rules-based decision process to determine whether a credit should issue automatically to the cardholder, automatically issuing a credit to the cardholder when the rules from the merchant or issuing bank are satisfied and investigating the disputed transaction further when those rules are not satisfied.

A fourth, separate aspect of the present invention relates to the method of effecting a chargeback, through use of a third party entity. That is, a business entity otherwise not associated with the credit card transaction cycle becomes part of the cycle for the purpose of handling the chargeback. This entity is the point of contact for the customer, and interfaces with the other necessary entities within the credit card system, to determine how the request for chargeback should be handled.

A fifth, separate aspect of the present invention relates to the use of a method and system for blocking a call from a caller or telephone number in order to avoid accepting a call from a potential purchaser of a good or service or from a potential claimant for a chargeback. In one implementation, the system would receive the caller's ANI or calling ID, that information would be compared to a list, preferably a negative list, and the call would not be answered. The list could be compiled at the request of any of the commercial users of the system, such as the issuing or acquiring bank, merchants or credit card processing system such as the VISA system. Alternatively, the system itself could apply decision rules or criteria to determine when someone should be placed on the list, such as where a predetermined number of requests for chargeback had been made, or had been made within a certain period of time, or requests for chargeback were made excessively in certain types of transactions (e.g., e-commerce transactions where no customer signature is obtained) and the requests were denied. In this way, the caller is not permitted or enabled to make further purchases, and/or to request a chargeback through the system. This system avoids the costs associated with a purchase transaction which to a high degree of likelihood will be subjected to a request for chargeback, and no transport or toll charges are incurred receiving the call.

A sixth, separate aspect of the present invention is any of the above separate aspects, either individually or in some combination.

In a seventh aspect, the inventions relate to the associated hardware and systems, and the associated software for performing the methods described herein.

Further separate aspects of the present invention can also be found in a system of processing a cardholder's credit request that practices any of the above separate aspects, either individually or in some combination.

Other aspects, advantages and novel features of the present invention will become apparent from the following Detailed Description Of A Preferred Embodiment, when considered in conjunction with the accompanying figures.

DETAILED DESCRIPTION OF A PREFERRED EMBODIMENT

An improved method and system for handling credit requests from credit/charge cardholders is described here. Merchants 5, acquiring banks 4 and issuing banks 2 that agree to participate in this improved system will benefit from an efficient, time-saving and less costly method of handling credit and dispute requests.

Figure 1:
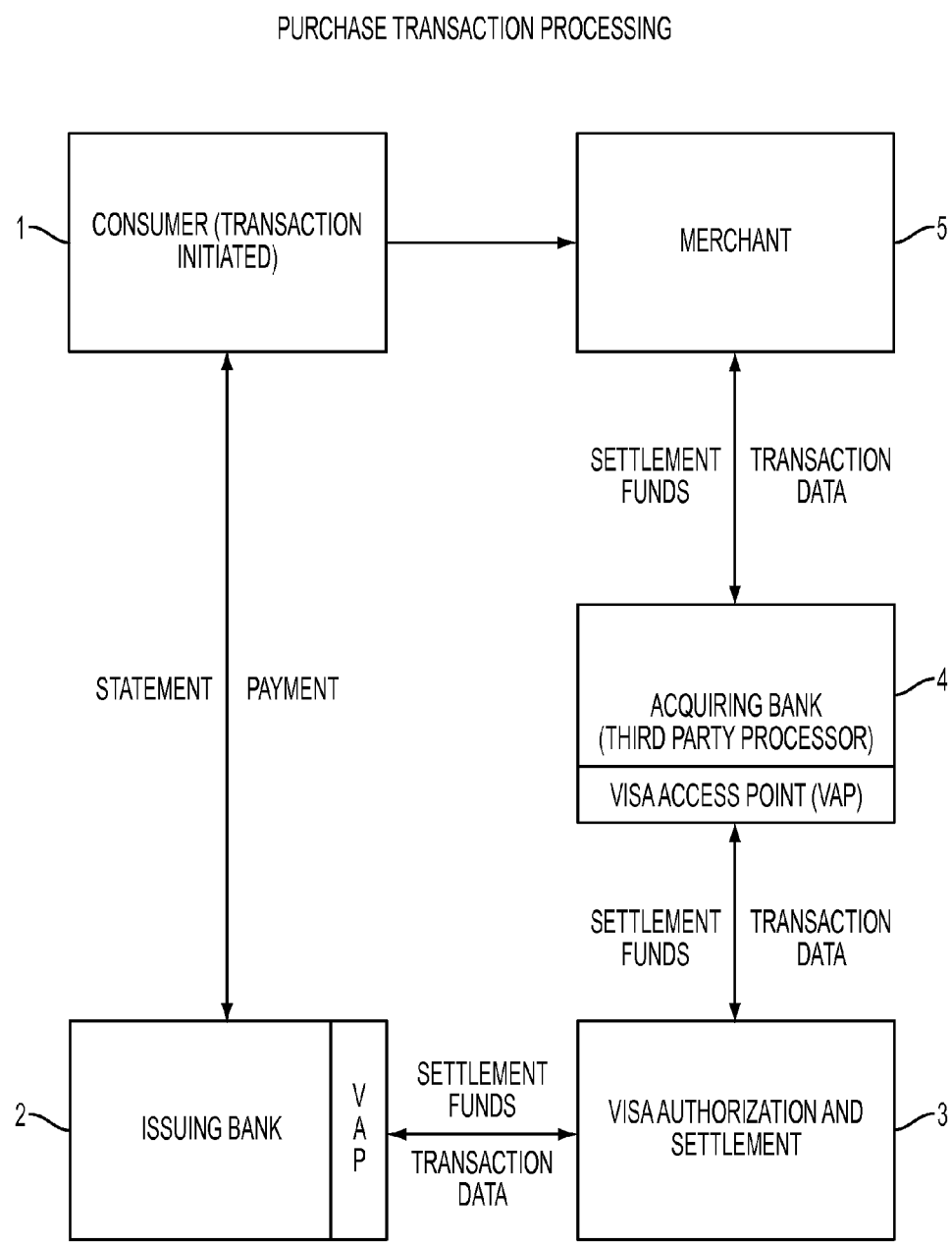
FIG. 1 is a block diagram of a prior art credit/charge card system that has an issuing bank, acquiring bank and a credit/charge card institution.
Figure 2:
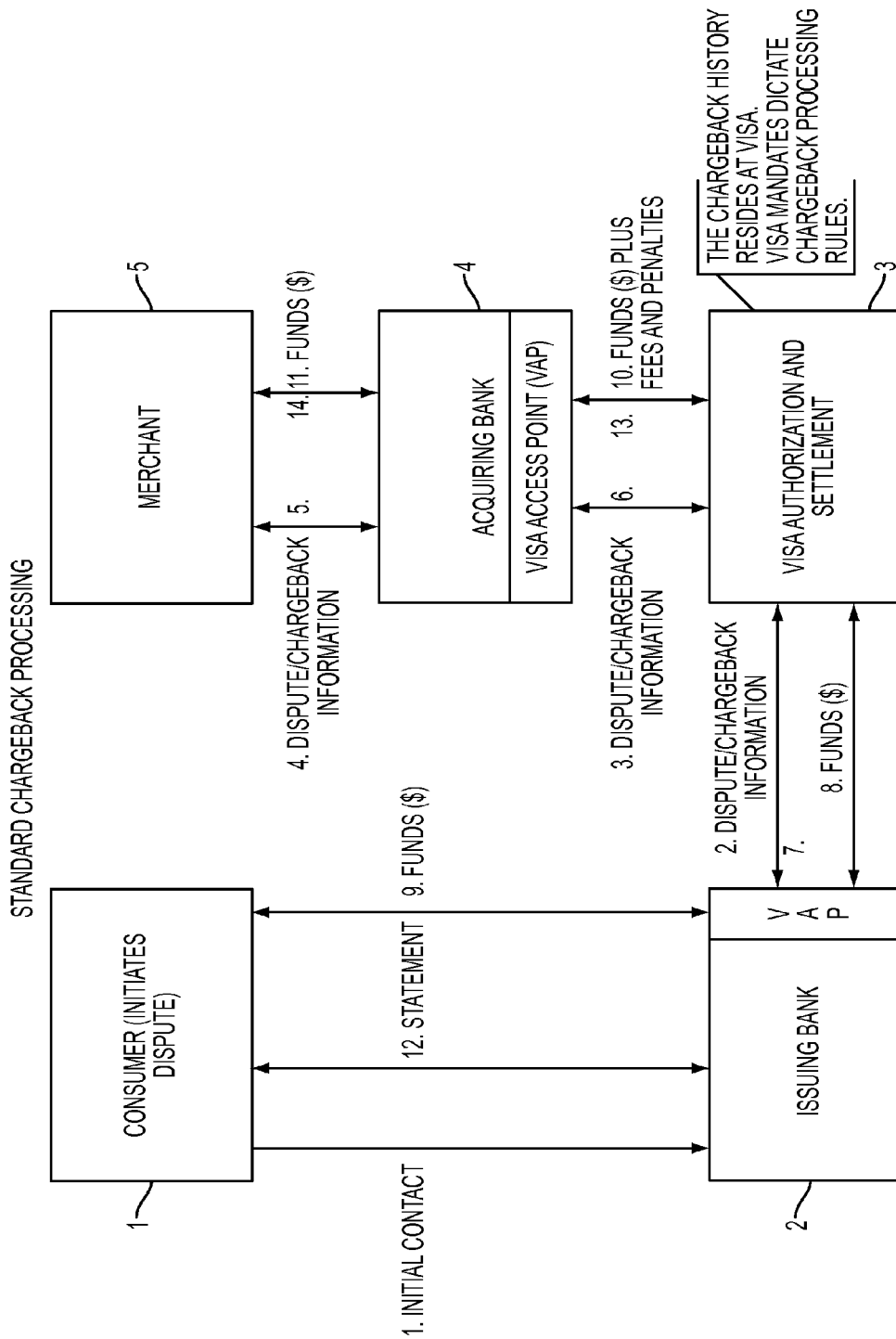
FIG. 2 is a block diagram of an example of a prior art credit/charge card system that has an issuing bank, acquiring bank, a credit/charge card institution and dispute processing center.
Figure 3:
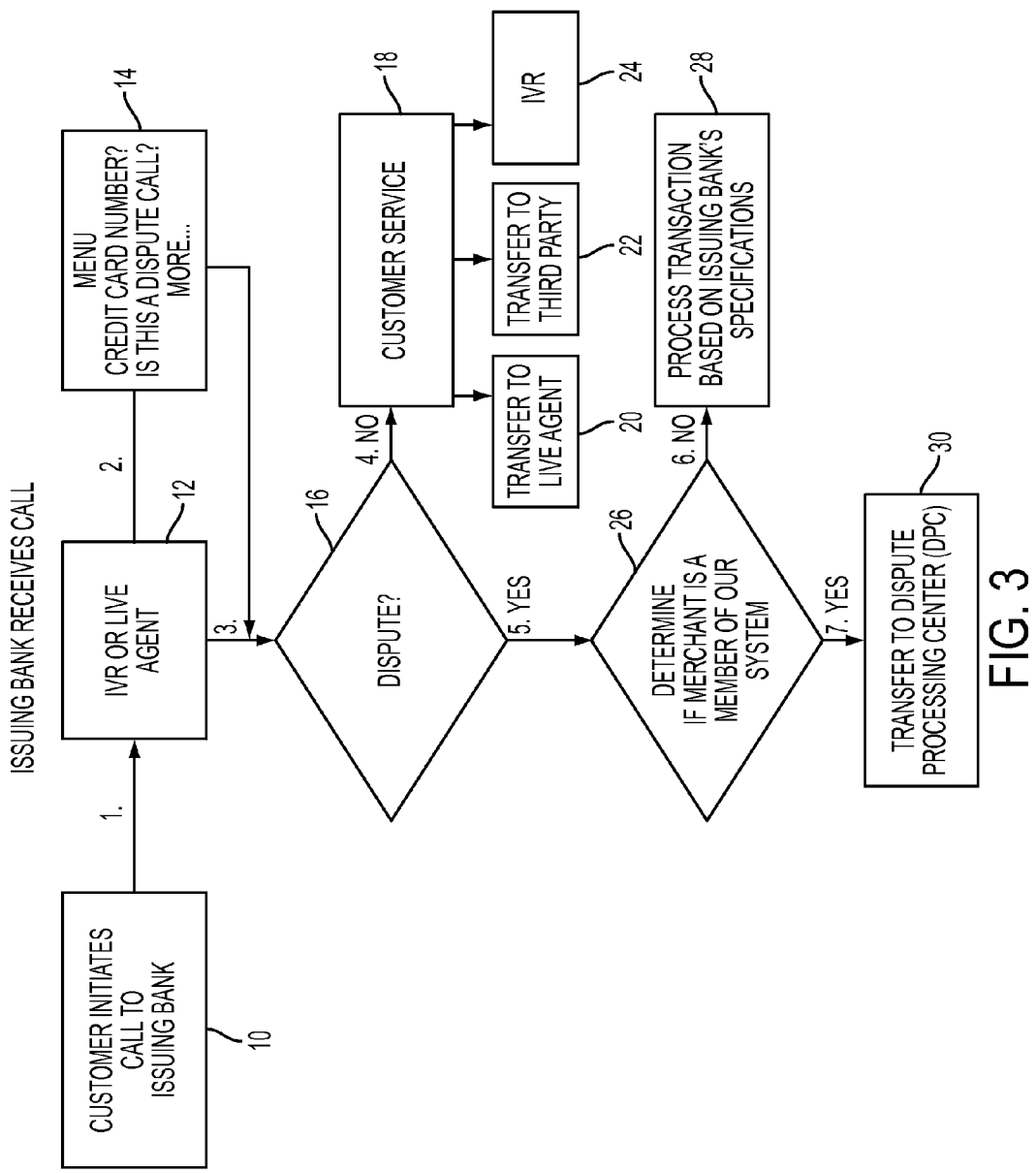
FIG. 3 is a flowchart of an example of how a cardholder initiates a dispute.

Turning to step 10 of FIG. 3, when a cardholder 1 disputes a certain charge, the cardholder 1 communicates the dispute to the issuing bank 2. As shown in steps 40, 42, 44, 46 and 48 of FIG. 4, when the cardholder 1 disputes a transaction, the cardholder 1 may call a phone number (e.g., a toll free number) or access a web site as directed on his billing statement, or otherwise communicates the dispute to the issuing bank 2 or third party. In step 12 of FIG. 3, the cardholder's call is handled by an information gathering mechanism. The information gathering mechanism may be, for example, an Interactive Voice Response ("IVR") system, a live agent, an internet interactive system, or an electronic mail (email) system, or any other means. An IVR (also called a VRU for "voice response unit" or "voice recognition unit") is a computerized answering service that prompts the cardholder to input answers to questions by pressing buttons on the telephone or by speaking answers. If the information gathering mechanism is an IVR which answers the telephone, the IVR may use a menu system to prompt the cardholder for answers to questions such as whether the call relates to a disputed transaction that appeared on the cardholder's billing statement. The information gathering mechanism may interact with the cardholder. For example, the information gathering mechanism may request the cardholder 1 to type, speak, or otherwise provide whether the call relates to a disputed transaction. Thus, the information gathering mechanism determines whether the cardholder's call relates to a disputed transaction, as shown in step 16 of FIG. 3 and steps 50 and 52 of FIG. 4. If not, customer service 18 may handle the call through a live agent (step 20), an IVR (step 24), or a third party (step 22).

Once it is known that the call relates to a disputed transaction, a number of actions or a combination of such actions may take place. First, certain information will be acquired through various methods relating to the cardholder and the transaction in dispute. The information gathering mechanism is capable of obtaining any information required to process the dispute including, for example, the credit card number. If the information gathering mechanism is an IVR which answers the telephone, the IVR may use a menu system to prompt the cardholder for answers to questions. For example, the information gathering mechanism may request the cardholder 1 to type, speak, or otherwise provide the credit/charge card number, a password, or other unique identification and verification number.

The information gathering mechanism optionally accesses a BIN/ICA file from the issuing bank 2 to correlate a credit/charge card number with the issuing bank and to obtain the issuing bank's identifying number, passwords, the bank's record of the consumer's, ANI (automatic number identification), the dollar amount of the transaction, and/or any other information. The information gathering mechanism also may gather information about the cardholder, the transaction at issue, and the merchant of the disputed transaction. Each transaction on the billing statement may be assigned a unique identification number. In the alternative, the transaction may be identified by amount and/or the date of the transaction.

If the cardholder 1 is disputing a transaction, the information gathering mechanism may ask the cardholder 1 to provide the billing statement containing the transaction in dispute, the transaction in dispute, the merchant's identification number for the transaction in dispute, the date of the transaction, the amount of the transaction, or any other information used to determine the transaction in dispute or the action to be taken or requested. To provide any of the above information, the cardholder 1 may be prompted in any manner. For example, the information gathering mechanism may ask the cardholder 1 to type or speak the transaction number at issue. The information gathering mechanism can ask the cardholder 1 for the reason for the dispute (i.e., the transaction was never made, the transaction was cancelled, the transaction was for a defective good or service, the transaction was made but the amount is wrong, etc). If a live agent handles the initial contact with the cardholder 1, the agent similarly can ask for information about the merchant and the transaction in dispute, or the transaction and merchant can be identified by the cardholder 1 via the internet or online banking system. In each instance, the data which is input is stored in memory, such as computer memory or other high density memory.

The information gathering mechanism optionally may have access to the issuing bank's computer database, such as BIN/ICA files at the issuing bank 2, so that the DPC 6 can obtain further information about the cardholder 1 or the transaction. For example, the DPC 6 may find out from the cardholder's input or from the issuing bank's database the following examples of information: the number of times that this particular cardholder has requested credits in the past, the length of time, e.g., number of months, that the cardholder has been a cardholder, the cardholder's credit rating, the average monthly balance, the average monthly purchases, the average interest paid on the account, the average fees paid on the account, the amount of the transaction at issue, further information about the transaction at issue, further information about the merchant at issue, the type of good or service involved in the disputed transaction, and the number of times that the particular merchant has had to give a credit to cardholders in the past. Thus, the information gathering mechanism optionally accesses to obtain information such as the cardholder's credit history, charge history, outstanding transactions, credit limit, transaction history and/or other information.

By way of example, the card number (step 54) and information about the cardholder (step 56) may be captured. In addition, the system may validate the authenticity of the card (step 58). In validating the card, the system may obtain information to determine whether the caller is authorized to discuss the billing statement. For example, the system may obtain information from the issuing bank about the ANI, cardholder's address, the maiden name of the cardholder's mother, the card status (active, open, suspended, inactive, etc), the expiration date of the card, the password or PIN, and/or other information.

The system may also identify the disputed transaction (step 60) as discussed above. For instance, the system may obtain information such as the transaction amount, transaction date, disputed amount, unique ID number of the transaction or merchant, and/or a reference number. Identification of the transaction in dispute allows the DPC 6 or the issuing bank 2 to identify the merchant 5. If, for example, the issuing bank 2 obtained the information, the information may be passed or given to a DPC 6. The information may be passed from the issuing bank 2 to the DPC 6 through the internet or email, for example.

The system may verify the status of the disputed transaction and its eligibility for dispute resolution based upon rules or interaction with the issuing bank, merchant bank, merchant, cardholder, and/or interchange (step 62). To determine whether the disputed transaction is eligible for dispute resolution in the improved system, the system determines as one option whether the transaction at issue falls within the mandated time allotted for a cardholder to dispute a transaction. For example, the system can determine whether the date on which the cardholder called in the dispute is within a certain number of days after the date of the transaction at issue. The system also may determine if the merchant 5, acquiring bank 4, or the issuing bank 2 are participants in the improved system. There are numerous ways to identify the transaction, merchant 5, cardholder 1, issuing bank 2, acquiring bank 4, or third party processor to determine if the merchant 5, acquiring bank 4, or the issuing bank 2 are participants in the improved system. For example, a participating merchant 5 may be assigned a unique identification number which may appear on the cardholder 1's monthly billing statement for each transaction with that merchant 5. For a call about a disputed transaction, the information gathering mechanism determines whether the merchant of the disputed transaction is a member participant of the improved system for handling disputes, as shown in step 26. If the merchant is not a member participant, the disputed transaction may be deemed ineligible for dispute resolution within the improved system and is processed in accordance with the issuing bank's rules in any manner known in the prior art. If the disputed transaction is ineligible for dispute resolution within the improved system, the cardholder is referred to customer service (step 66).

Figure 4:
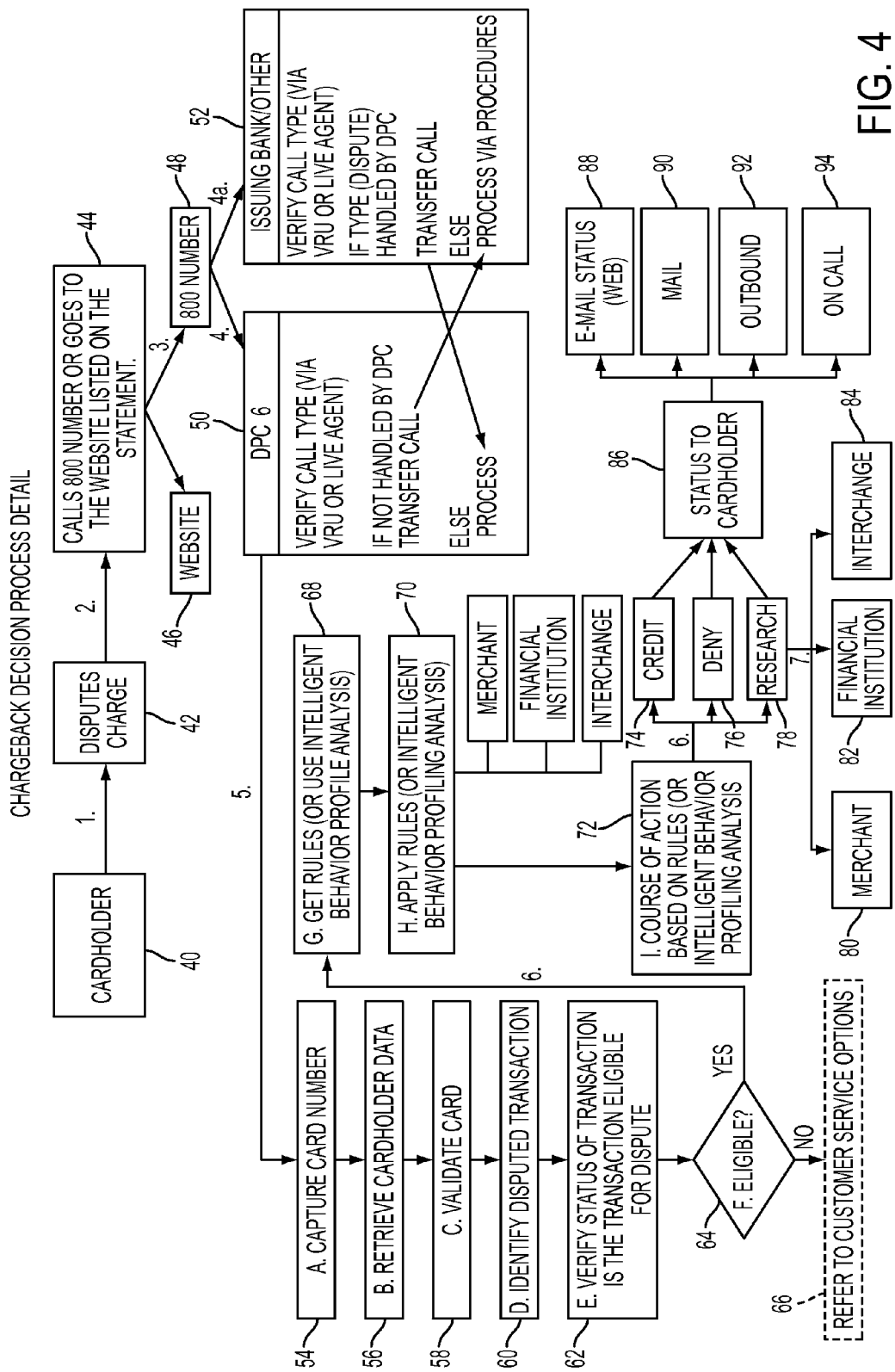
FIG. 4 is a flowchart of an embodiment of an improved system for handling a disputed transaction.

However, if the merchant is a member participant and the disputed transaction is eligible for dispute resolution within the improved system, the disputed transaction is transferred to a dispute processing center (DPC) 6, as shown in step 30 of FIG. 3 and step 50 of FIG. 4. Alternatively, the disputed transaction could be handled by the issuing bank 2 or a third party, as shown in step 52 of FIG. 4. The system then retrieves or otherwise gains access to the identity and rules of the issuing bank 2, merchant 5, acquiring bank 4, third party processor, and/or interchange. The rules may be customized for the particular merchant involved, the financial institutions involved (issuing bank 2 and acquiring bank 4) and the interchange institution (such as VISA, MasterCard, etc). Because the rules may be changed as appropriate, the system retrieves the appropriate rules to apply to the disputed transaction. After retrieving the applicable rules, the system applies a rules-based or artificial intelligence decision process to determine whether to credit the cardholder's account and if so, the amount of the credit. The dispute resolution process may apply the rules, artificial intelligence process, or an intelligent behavior profiling analysis. The dispute-resolution process can be implemented by a computer or a computing system which makes its decision based at least in part on the information gathered and the rules which apply.

The rules for determining whether to grant an automatic credit may differ for each merchant, or for each issuing bank. Likewise, the rules for determining whether to do an automatic chargeback to the merchant may differ for each merchant, or for each issuing bank. Some issuing banks are more willing to spend time and money investigating credit requests, while other issuing banks are more willing to simplify the matter and grant a credit. Because the cost of investigating a disputed transaction was traditionally high (roughly $25 to $50 per disputed transaction), an issuing bank may be inclined to forego the investigation and simply grant a credit to the cardholder if the amount of the transaction is, for example, only $10. Similarly, the acquiring bank 4 may have custom rules which must be considered before a credit is issued and/or before a chargeback to the merchant 5 is performed. Additionally, each merchant 5 who is a member participant may specify its own rules for when it is willing to waive its right to prove the transaction such that a chargeback is automatically issued to the merchant 5. For example, a merchant 5 may specify that if the transaction is $20 or less, it will accept an automatic chargeback without the merchant's involvement and if the transaction is greater than $20, the merchant 5 wants to receive notice of the dispute and the opportunity to prove or verify the authenticity of the transaction. Alternatively, the merchant may be notified directly by the dispute processing center of the dispute, and some or all of the issues related to it, and solicit a response from the merchant (e.g., pay the request for credit, dispute it, consider certain information). Because the rules-based decision process permits an automatic credit to the cardholder 1 and/or an automatic chargeback to the merchant 5, roughly $25-$50 per automatically-resolved transaction is saved by the issuing bank 2, acquiring bank 4 and the credit/charge card institution 3. Automatic credits and/or chargebacks can be kept private from the issuing bank 2 so that the merchant 5 will not be punished with fees, fines, and/or termination from the privilege of accepting the issuing bank's credit/charge card. This approach assists those marginal merchants who have a high incidence of chargebacks, but are willing to give credits automatically. Alternatively, automatic credits and/or chargebacks can be recorded for each merchant 5 so that certain merchants can be punished with fees, fines, and/or termination from the privilege of accepting the issuing bank's credit/charge card.

By applying the applicable rules, the system determines the appropriate course of action as shown in step 72. Any number of inputs may be made into the decision system. For example, one input may be the reason stated by the customer for the chargeback. Another factor could be the dollar amount of the transaction, or the dollar amount of the requested chargeback. Other information could include the number of requests for chargeback made by the customer, either throughout the life of their card, in total, or for some more recent, limited period of time. The chargeback requests made specifically for the involved merchant may be utilized, or the number of chargeback requests for a type or class of transaction (e.g., web based purchases) may be utilized. Another input factor may include whether the transaction was preauthorized or not. Yet other inputs may involve information the merchant can provide regarding the transaction, such as proof of shipping, other information from the credit card of the customer (e.g., additional data, such as from the back side of the card). Input of a temporal nature may be used, such as the time between the charge and the request for the chargeback, or the time difference between the billing of the transaction and the request for the chargeback.

The selected course of action could include the issuance of a credit (step 74), the denial of a credit (step 76), or the request for further research or other action directed by the issuing bank, merchant bank, merchant, cardholder, or interchange (step 78). If the rules determine that further research is required, the system may contact the merchant, the financial institution(s), and/or the interchange, as shown in steps 80, 82 and 84. Other possible actions include transferring the cardholder 1 to a live agent, transferring the cardholder 1 to the issuing bank 2, transferring the cardholder 1 to the merchant 5 of the disputed transaction, transferring the cardholder 1 to the acquiring bank 4, and/or requesting additional information at any time from the cardholder 1. The system communicates the resolution or status to all parties as shown in step 86. Status may be conveyed by any means such as email, ordinary mail, telephone call, facsimile or any other outbound messaging system, as shown by steps 88, 90, 92 and 94.

Figure 5:
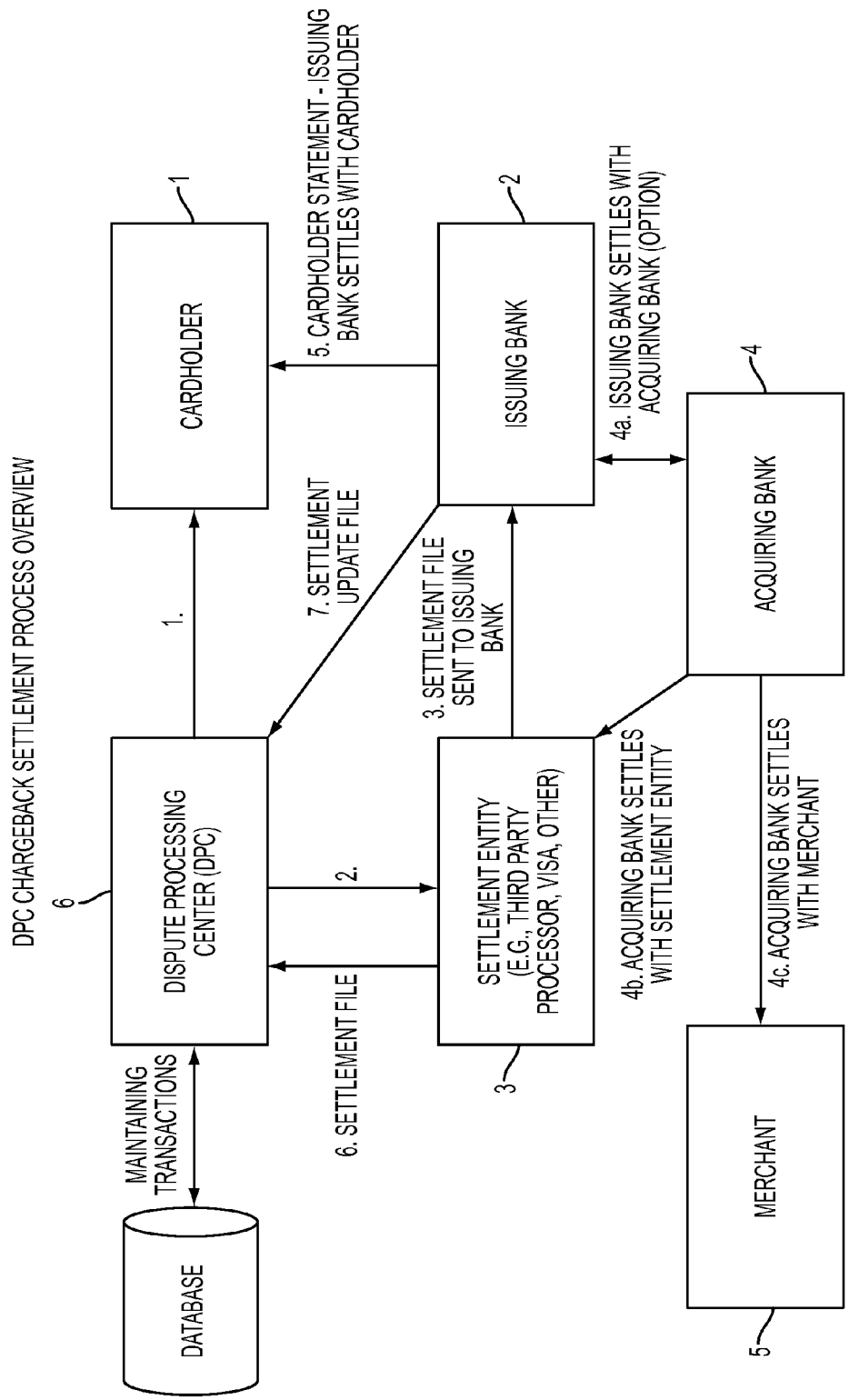
FIG. 5 is a flowchart of an embodiment of an improved system for handling a disputed transaction after the system resolves the dispute.

FIG. 5 illustrates an example flowchart of a chargeback settlement process in the improved system after the system has determined the proper resolution for the disputed transaction. The settlement will take place based upon the process agreed upon between the parties, an example of which is illustrated in FIG. 5. The DPC 6 may convey information and status to the cardholder 1, as shown in step 1. In step 2, the DPC 6 sends information and its proposed dispute resolution to the interchange or settlement entity 3. The interchange 3 forwards a settlement file containing the relevant information and the dispute resolution to the issuing bank 2, as shown in step 3. The issuing bank 2 optionally may settle with the acquiring bank 4 by transferring money if required, as shown in step 4a, and the acquiring bank 4 would then settle with the interchange 3, as shown in step 4b. The acquiring bank 4 settles with the merchant 5, as shown in step 4c. A settlement file is then forwarded from the interchange 3 to the DPC 6, as shown in step 6. When the issuing bank 2 settles the dispute with the cardholder 1, the resolution is printed on the cardholder's billing statement as shown in step 5. The issuing bank 2 may also send an update about the settlement file to the DPC 6, as shown in step 7. Funds or monies may be transferred between the issuing bank 2 and the DPC 6, the issuing bank 2 and the merchant 5, the acquiring bank 4 and the merchant 5, and the acquiring bank 4 and the DPC 6. The transferring of settlement files, updates and funds ensures that each entity in the system knows the final resolution of the dispute.

In yet another aspect of this invention, the methods, apparatus and software may be operated so as to block a call from certain callers, either desiring to pursue a purchase transaction for a good or service or desiring a chargeback. In one embodiment, the system would obtain the caller's automatic identification (ANI) or other form of caller identification, and compare that with a list which would designate phone numbers from which calls will be declined. The list is preferably a negative list, in that it contains a list of numbers for which the call will be declined. The list may be generated from any number of sources, such as from the issuing or acquiring bank, from merchants or from the credit card processing entity itself. Alternatively, the system may generate the list based upon various factors, such as the caller's history with respect to the system. For example, if the calling number has been used a predetermined number of times, or a predetermined number of times within a given time period, such as four times in a given month, or if excessive requests for chargeback are made for certain types of transactions, such as those where no customer signature is obtained, but the request for a chargeback has been declined in all cases, further calls may be declined through the system. Alternatively, the system may decline calls for some period of time, such as a predetermined period of time, or a period of time until there is a reduced frequency in attempts to call the system by the calling number. In this way, the system and/or sponsors of the system need not incur the costs associated with an initial transaction, and further avoid the costs associated with the chargeback, including the toll charges for callers from whom it has been determined that no chargeback will be made. In one variation, the list may be compiled by the entity handling the chargeback requests, and then may be provided to another party, such as a merchant having their own incoming telephone-based order system.

In one aspect, the inventions may be implemented in a business where the business is not typically involved in the processing of credit cards. The third party, or stand alone business, may for example be in the customer care business or dispute resolution business. By standing outside of the traditional credit card charging system, the third party may be able to resolve disputes more quickly, such as by directly interfacing with the merchant, and permitting the merchant to resolve the dispute without having the dispute recorded against it in the formal credit card system.

In yet a final aspect, the methods described herein may be implemented in any variety of hardware systems. The associated software for performing the methods, and controlling the hardware, are within the scope of the inventions.

While embodiments and implementations of the subject invention have been shown and described, it should be apparent that many more embodiments and implementations are within the scope of the subject invention. Accordingly, the invention is not to be restricted, except in light of the claims and their equivalents.

What is claimed is:

1. A method for processing a plurality of transactions that are disputed by respective cardholders, wherein the transactions involve a plurality of different merchants and appear on the cardholders' credit or charge card accounts, the method comprising:

obtaining information about disputed transactions, via an input to a data processor for a network dispute system comprising an automatic information gathering system and an interactive voice response unit, from a cardholder involved with the disputed transactions, wherein the information is stored in a memory of the dispute system, wherein the obtained information comprises accessing a file from an issuing bank to correlate a credit/charge number with the issuing bank and further obtaining a merchant's identification number from the issuing bank for a transaction in dispute;

determining, via the automatic information gathering system wherein no manual input is applied, that a plurality of different merchants are members of the network dispute system wherein if the merchants are not members of the system, the disputed transactions are not eligible for processing in the dispute system;

applying, via the automatic information gathering system wherein no manual input is applied, at least one of a plurality of respective rules provided by the merchants having a plurality of respective third party processors, wherein the data processor accesses the memory and at least one of the plurality of respective third party processors to determine an output based on the received input, the output being one of that a credit should issue automatically to the cardholder based on the obtained information and that a credit should not issue based on the obtained information;

determining, via the automatic information gathering system obtaining information via the accessed file, that a credit should not be issued when the obtained information indicates that the cardholder made a predetermined number of requests for chargebacks related to e-commerce transactions where the cardholder's signature was not obtained; and blocking an incoming call by the cardholder until the cardholder reduces a frequency of attempts to call the system below a predetermined threshold when the automatic information gathering system determines that a credit should be not be issued.

2. The method of claim 1 further comprising the step of obtaining rules from a merchant.

3. The method of claim 2 wherein the rules for a first one of the merchants differ from the rules for a second one of the merchants.

4. The method of claim 1 further comprising the step of obtaining rules from an issuing bank.

5. The method of claim 4 wherein the rules for a first issuing bank differ from the rules for a second issuing bank.

6. The method of claim 1 wherein the rules determine that a credit should issue automatically to the cardholder if the credit is less than a certain dollar amount.

7. The method of claim 1 wherein the rules determine that a credit should issue automatically to the cardholder based at least in part on a characteristic of the cardholder.

8. The method of claim 7 wherein the characteristic is the credit history of the cardholder.

9. The method of claim 7 wherein the characteristic is the number of previous disputes raised by the cardholder.

10. The method of claim 7 wherein the characteristic is the average monthly balance of the cardholder's account.

11. The method of claim 7 wherein the rules determine whether a credit should issue automatically to the cardholder based at least in part on the number of previous disputes raised against a given merchant by any cardholder.

12. The method of claim 7 wherein the rules determine that a credit should issue automatically to the cardholder based at least in part on the type of good or service involved in the disputed transaction.

13. The method of claim 7 wherein the rules determine that a credit should issue automatically to the cardholder based at least in part on the rules of the issuing bank that issued the credit/charge card to the cardholder.

14. The method of claim 7 wherein the rules determine that a credit should issue automatically to the cardholder based at least in part on the rules of the acquiring bank that is a given merchant's bank.

15. The method of claim 1 further comprising the step of investigating the disputed transaction further when the rules determine that a credit should not automatically issue to the cardholder.

16. The method of claim 1 further comprising the step of applying a second set of rules to determine that a chargeback should be made automatically to a given merchant.

17. The method of claim 16 further comprising the step of investigating the disputed transaction further when the rules determine that a chargeback should not automatically issue to a given merchant.

18. A system for processing a plurality of transactions that are disputed by respective cardholders, wherein the transactions involve a plurality of different merchants and appear on the cardholders' credit or charge card accounts, the system comprising:
- an automatic information gathering system, comprising an interactive voice response unit wherein no manual input is applied, that obtains information about disputed transactions from a cardholder involved with the disputed transactions, wherein the information is stored in a memory, wherein the obtained information comprises accessing a file from an issuing bank to correlate a credit/charge number with the issuing bank and further obtaining a merchant's identification number from the issuing bank for a transaction in dispute;
- a data processor located within the automatic information gathering system that gathers information from the cardholder and determines that the merchants are members of the automatic information gathering system wherein no manual input is applied, wherein if the merchants are not members of the system, the disputed transactions are not eligible for processing in the information gathering system;
- a plurality of respective rules provided by the merchants having a plurality of respective third party processors, wherein the data processor accesses the at least one of the plurality of third party processors to produce an output, and wherein the automatic information gathering system obtains information via the accessed file, which rules determine at least one of:
  that a predetermined number of requests for chargebacks related to the disputed transactions had been made by the cardholder related to e-commerce transactions where the cardholder's signature was not obtained based on the obtained information;
  that a credit should issue automatically to the cardholder based on the obtained information; and
- a rules-based processor which applies the plurality of rules to the output of the interaction with the data processor of the information gathering system and the at least one of the plurality of merchant's plurality of respective third party processors to block an incoming call by the cardholder until the cardholder reduces a frequency of attempts to call the system below a predetermined threshold when the obtained information results in the predetermined number of chargebacks made by the cardholder related to e-commerce transactions where the cardholder's signature was not obtained.

19. The system of claim 18 wherein the plurality of rules include rules specific to different ones of the merchants.

20. The system of claim 19 wherein the plurality of rules include at least one rule for a first one of the merchants and at least one rule for a second merchant that differ from the rule for the first merchant.

21. The system of claim 18 wherein the plurality of rules include rules specific to an issuing bank.

22. The system of claim 19 further comprising rules for a first issuing bank and rules for a second issuing bank which differ from the rules for the first issuing bank.

23. The system of claim 18 wherein the rules determine that a credit should issue automatically to the cardholder if the credit is less than a certain dollar amount.

24. The system of claim 18 wherein the rules determine that a credit should issue automatically to the cardholder based at least in part on a characteristic of the cardholder.

25. The system of claim 24 wherein the characteristic is the credit history of the cardholder.

26. The system of claim 24 wherein the characteristic is the number of previous disputes raised by the cardholder.

27. The system of claim 24 wherein the characteristic is the average monthly balance of the cardholder's account.

28. The system of claim 18 wherein the rules determine that a credit should issue automatically to the cardholder based at least in part on the number of previous disputes raised against a given merchant by any cardholder.

29. The system of claim 18 wherein the rules determine that a credit should issue automatically to the cardholder based at least in part on the type of good or service involved in the disputed transaction.

30. The system of claim 18 wherein the rules determine that a credit should issue automatically to the cardholder based at least in part on the rules of the issuing bank that issued the credit/charge card to the cardholder.

31. The system of claim 18 wherein the rules determine that a credit should issue automatically to the cardholder based at least in part on the rules of the acquiring bank that is a given merchant's bank.

32. The system of claim 18 wherein the rules-based processor initiates an investigation of the disputed transaction when the rules determine that a credit should not automatically issue to the cardholder.

33. The system of claim 18 wherein the plurality of rules includes rules which determine that a chargeback should be made automatically to a given merchant.

34. The system of claim 33 wherein the rules-based processor initiates an investigation of the disputed transaction further when the rules determine that a chargeback should not automatically issue to a given merchant.

35. The method of claim 1, wherein the disputed transaction comprises a non-face-to-face transaction that is not associated with a written transaction slip.

36. The system of claim 18, wherein the disputed transaction comprises a non-face-to-face transaction that is not associated with a written transaction slip.

37. The method of claim 1, wherein obtaining information about the disputed transaction includes obtaining information about a disputed non-face-to-face transaction that is not associated with a written transaction slip.

38. The system of claim 18, wherein the information gathering system obtains information about a disputed non-face-to-face transaction that is not associated with a written transaction slip.

39. The method of claim 1, wherein applying a plurality of rules includes automatically applying a plurality of rules to determine that the credit should issue to the cardholder.

40. The system of claim 18, wherein the rules-based processor automatically applies the plurality of rules and automatically issues the credit to the cardholder if the plurality of rules determine that the credit should issue automatically to the cardholder.

41. The method of claim 1, further comprising transferring the information to a dispute processing entity other than the issuer.

42. The method of claim 41, wherein applying a plurality of rules is performed at least in part by the dispute processing entity.

43. The method of claim 41, wherein issuing a credit to the cardholder is performed at least in part by the dispute processing entity.

44. The system of claim 18, further comprising at least one dispute processing entity other than the issuer, the dispute processing entity receiving the information.

45. The system of claim 44, wherein the dispute processing entity applies the plurality of rules.

46. The system of claim 44, wherein the dispute processing entity issues the credit to the cardholder.

47. The method of claim 1, wherein applying a plurality of rules includes applying a plurality of rules to determine that a credit should issue to the cardholder without involving an issuer of the credit or charge card account in approval of the chargeback.

48. The method of claim 1, wherein automatically issuing a credit to the cardholder includes issuing a credit to the cardholder if the rules determine that a credit should issue to the cardholder without involving an issuer of the credit or charge card account in approval of the chargeback.

49. The method of claim 1, wherein applying a plurality of rules includes applying a plurality of rules to determine that a credit should issue to the cardholder without involving an issuer of the credit or charge card account in approval of the chargeback; and wherein automatically issuing a credit to the cardholder includes issuing a credit to the cardholder if the rules determine that a credit should issue to the cardholder without involving the issuer account in approval of the chargeback.

50. The system of claim 18, wherein at least one of the rules is adapted to determine that a credit should issue to the cardholder without involving an issuer of the credit or charge card account in approval of the chargeback.

51. The system of claim 18, wherein the rules-based processor is adapted to issue a credit to the cardholder without involving an issuer of the credit or charge card account in approval of the chargeback.

52. The system of claim 18, wherein at least one of the rules is adapted to determine that a credit should issue to the cardholder without involving an issuer of the credit or charge card account in approval of the chargeback; and wherein the rules-based processor is adapted to issue a credit to the cardholder without involving the issuer of the credit or charge card account in approval of the chargeback.

53. A method for enabling a third-party dispute processing entity to process a plurality of transactions that are disputed by respective cardholders, wherein the transactions involve a plurality of different merchants and appear on the cardholders' credit or charge card accounts, the method comprising:

obtaining initial information about disputed transactions, via an automatic information gathering system and an interactive voice response unit, from a cardholder involved with the disputed transactions through a data processor of an interactive information gathering mechanism, wherein the obtained information comprises accessing a file from a financial institution to correlate a credit/charge number with the financial institution and further obtaining a merchant's identification number from the financial institution for a transaction in dispute;

determining, via the automatic information gathering system wherein no manual input is applied that a plurality of different merchants are members of the network dispute system wherein if the merchants are not members of the system, the disputed transactions are not eligible for processing in the interactive information gathering mechanism;

determining, via automatic information gathering system obtaining information via the accessed file, that a predetermined number of requests for chargebacks had been made by the cardholder related to e-commerce transactions where the cardholder's signature was not obtained, wherein the data processor is communicably coupled to at least one of a plurality of third party processors of at least one of a plurality of respective merchants and/or financial institutions and the coupling establishes the determining;

and blocking an incoming call by the cardholder until the cardholder reduces a frequency of attempts to call the system below a predetermined threshold when determined that the cardholder exceeded the predetermined number of requests for chargebacks.

\* \* \* \* \*